US012575557B2

(12) United States Patent
Deckert

(10) Patent No.: US 12,575,557 B2
(45) Date of Patent: Mar. 17, 2026

(54) ANIMAL SCENT DISPENSER

(71) Applicant: Kendall M. Deckert, Dolton, SD (US)

(72) Inventor: Kendall M. Deckert, Dolton, SD (US)

( * ) Notice: Subject to any disclaimer, the term of this patent is extended or adjusted under 35 U.S.C. 154(b) by 0 days.

(21) Appl. No.: 18/796,869

(22) Filed: Aug. 7, 2024

(65) Prior Publication Data

US 2026/0041084 A1 Feb. 12, 2026

(51) Int. Cl.
*A01M 31/00* (2006.01)

(52) U.S. Cl.
CPC .................................. *A01M 31/008* (2013.01)

(58) Field of Classification Search
CPC ........................... A01M 31/008; A01M 1/2061
USPC .................................................................. 43/1
See application file for complete search history.

(56) References Cited

U.S. PATENT DOCUMENTS

| | | | | | |
|---|---|---|---|---|---|
| 4,771,563 | A | * | 9/1988 | Easley | A01M 31/008 |
| | | | | | 219/521 |
| 5,307,584 | A | * | 5/1994 | Jarvis | A01M 31/008 |
| | | | | | 239/57 |
| 5,361,527 | A | * | 11/1994 | Burgeson | A01M 31/008 |
| | | | | | 43/1 |
| 5,547,616 | A | * | 8/1996 | Dancs | A01M 1/2055 |
| | | | | | 261/DIG. 65 |
| 6,033,212 | A | * | 3/2000 | Bonnema | A01M 29/12 |
| | | | | | 431/344 |
| 6,158,668 | A | * | 12/2000 | Burgeson | A01M 31/008 |
| | | | | | 239/47 |

| | | | | | |
|---|---|---|---|---|---|
| 6,209,252 | B1 | * | 4/2001 | McGough | A01M 31/008 |
| | | | | | 43/1 |
| 7,040,548 | B2 | | 5/2006 | Rodgers | |
| 7,883,677 | B2 | * | 2/2011 | Palozzi | A01M 31/008 |
| | | | | | 422/126 |
| 9,426,977 | B1 | | 8/2016 | Wynalda | |
| 9,585,981 | B2 | * | 3/2017 | Wynalda, Jr. | F22B 1/284 |
| 10,448,646 | B2 | * | 10/2019 | Maruyama | A01M 31/008 |
| 11,140,895 | B2 | * | 10/2021 | Wynalda, Jr. | A01M 31/008 |
| 11,641,882 | B2 | | 5/2023 | Dendy | |
| 11,653,643 | B2 | * | 5/2023 | Wynalda, Jr. | F01K 5/00 |
| | | | | | 392/390 |
| 12,285,003 | B1 | * | 4/2025 | Armand | A01M 31/008 |
| 2003/0037476 | A1 | * | 2/2003 | Peavy | A01M 31/008 |
| | | | | | 43/1 |
| 2006/0196100 | A1 | * | 9/2006 | Laudamiel-Pellet | A61L 9/125 |
| | | | | | 43/1 |
| 2008/0092426 | A1 | | 4/2008 | Modlin | |

(Continued)

*Primary Examiner* — Timothy D Collins
*Assistant Examiner* — Maria E Graber

(57) ABSTRACT

An animal scent dispenser includes a housing, a support structure, a heating compartment, and a blower assembly. The housing includes a main body and a cover assembly to permit access to an interior of the main body, wherein the housing includes a plurality of apertures to allow air to flow through the housing. The support structure is positioned in the main body and designed to support an animal scent device within the main body. The heating compartment is positioned in the main body and designed to store an unpowered heat source therein. The blower assembly is positioned in the main body and is designed to draw air into the housing, conduct the air past the unpowered heat source to heat the air, conduct the air past an animal scent device, and conduct the air and animal scent material out of the housing.

19 Claims, 7 Drawing Sheets

(56)          References Cited

U.S. PATENT DOCUMENTS

2008/0244954  A1 *  10/2008  Shannon ................. A61L 9/122
                                                    43/1
2015/0096218  A1 *   4/2015  Burr ................... A01M 31/008
                                                    43/1
2017/0311585  A1 *  11/2017  Shearer ............... A01M 31/008

* cited by examiner

ANIMAL SCENT DISPENSER

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to animal scent lures and more particularly pertains to a new animal scent dispenser, such as for hunting deer or other game, for use in outdoor environments in both hot and cold temperatures that is small and portable and utilizes an unpowered heating source, such as heating packets.

(2) Description of Related Art Including Information Disclosed Under 37 CFR 1.97 and 1.98

The prior art relates to animal scent lures. The prior art, as best understood, does not disclose an animal scent dispenser that is portable and usable in both hot and cold temperatures and utilizes an unpowered heating source, such as heating packets, in conjunction with a blower unit.

(h) BRIEF SUMMARY OF THE INVENTION

An embodiment of the disclosure meets the needs presented above in an animal scent dispenser generally comprising a housing, a support structure, a heating compartment, and a blower assembly. The housing includes a main body, having a first end and a second end, and a cover assembly to permit access to an interior of the main body, wherein the housing includes a plurality of apertures to allow air to flow through the housing. The support structure is positioned in the main body and designed to support an animal scent device within the main body. The heating compartment is positioned in the main body and designed to store an unpowered heat source therein. The blower assembly is positioned in the main body and is designed to draw air into the housing, conduct the air past the unpowered heat source to heat the air, conduct the air past an animal scent device, and conduct the air out of the housing and into the surrounding environment to attract animals to the location of the animal scent dispenser.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
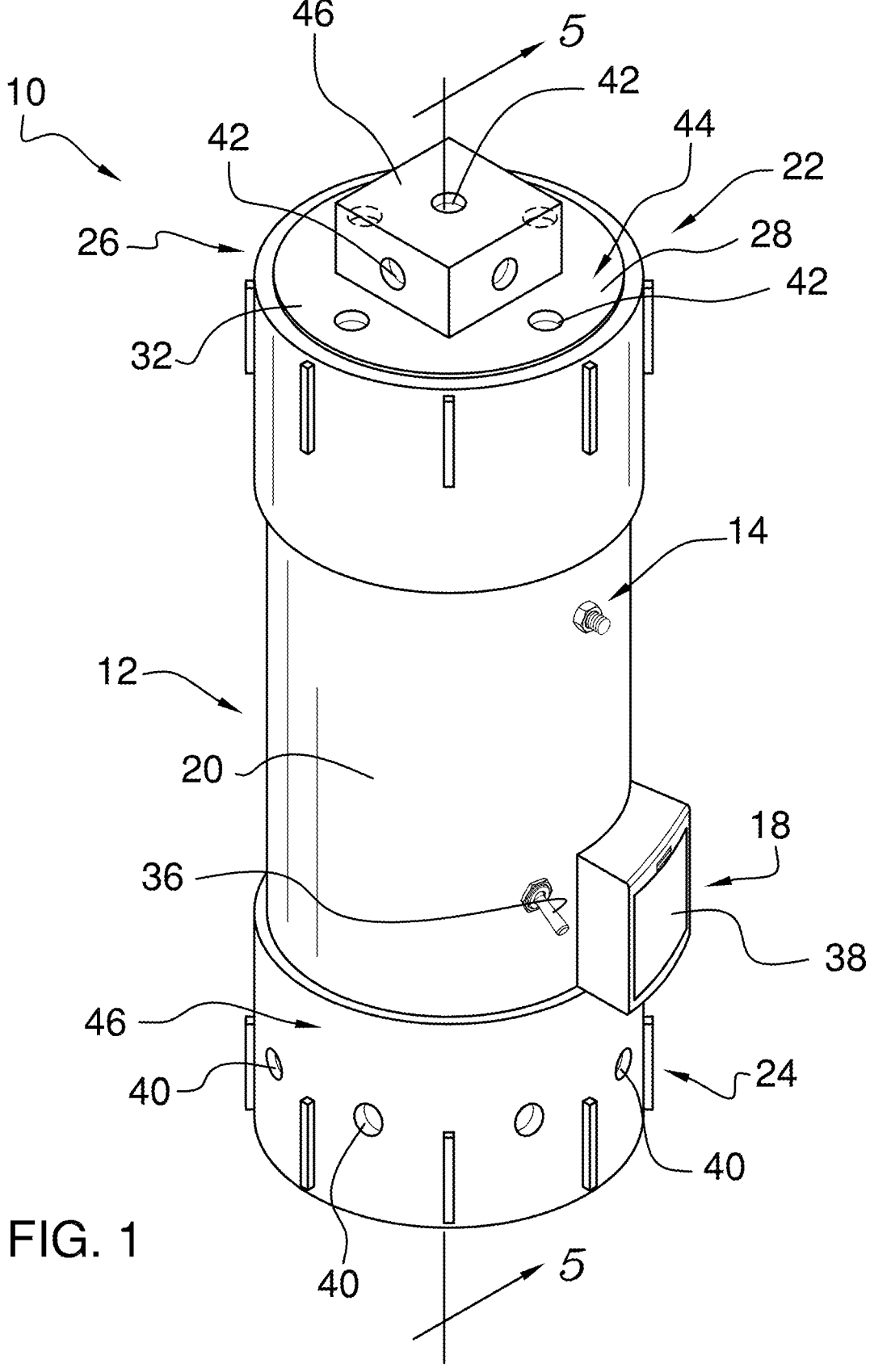
FIG. 1 is a perspective view of an animal scent dispenser according to an embodiment of the disclosure.

With reference now to the drawings, and in particular to FIGS. 1 through 7 thereof, a new animal scent dispenser embodying the principles and concepts of an embodiment of the disclosure and generally designated by the reference numeral 10 will be described.

As best illustrated in FIGS. 1 through 7, the animal scent dispenser 10 generally comprises a housing 12, a support structure 14, a heating compartment 16, and a blower assembly 18. The housing 12 includes a main body 20, having a first end 22 and a second end 24, and a cover assembly 26 to permit access to an interior of the main body 20. The housing includes a plurality of apertures to allow air to flow through the housing, which apertures in the exemplary embodiment shown are divided into air inlet apertures 40 and air outlet apertures 42, as discussed further below. The support structure 14 is positioned in the main body 20 and designed to support an animal scent device 70 within the main body 20, which animal scent device 70 could be a scent pad or canister or other scent-containing structure. The heating compartment 16 is positioned in the main body 20 and designed to store an unpowered heat source 72 therein. The blower assembly 18 is positioned in the main body 20 and is designed to draw air into the housing 12, conduct the air past the unpowered heat source 72 to heat the air, conduct the air, which is now heated, past an animal scent device 70, and conduct the air out of the housing 12 and into the surrounding environment to attract animals to the location of the animal scent dispenser 10. The heating of the air also results in the heating of the animal scent devices 70, which can minimize or prevent freezing of the animal scent devices 70, which freezing can inhibit the release of the animal scent chemicals and materials. The animal scent dispenser 10 therefore can be used in cold or freezing environments and still function optimally.

Figure 2:
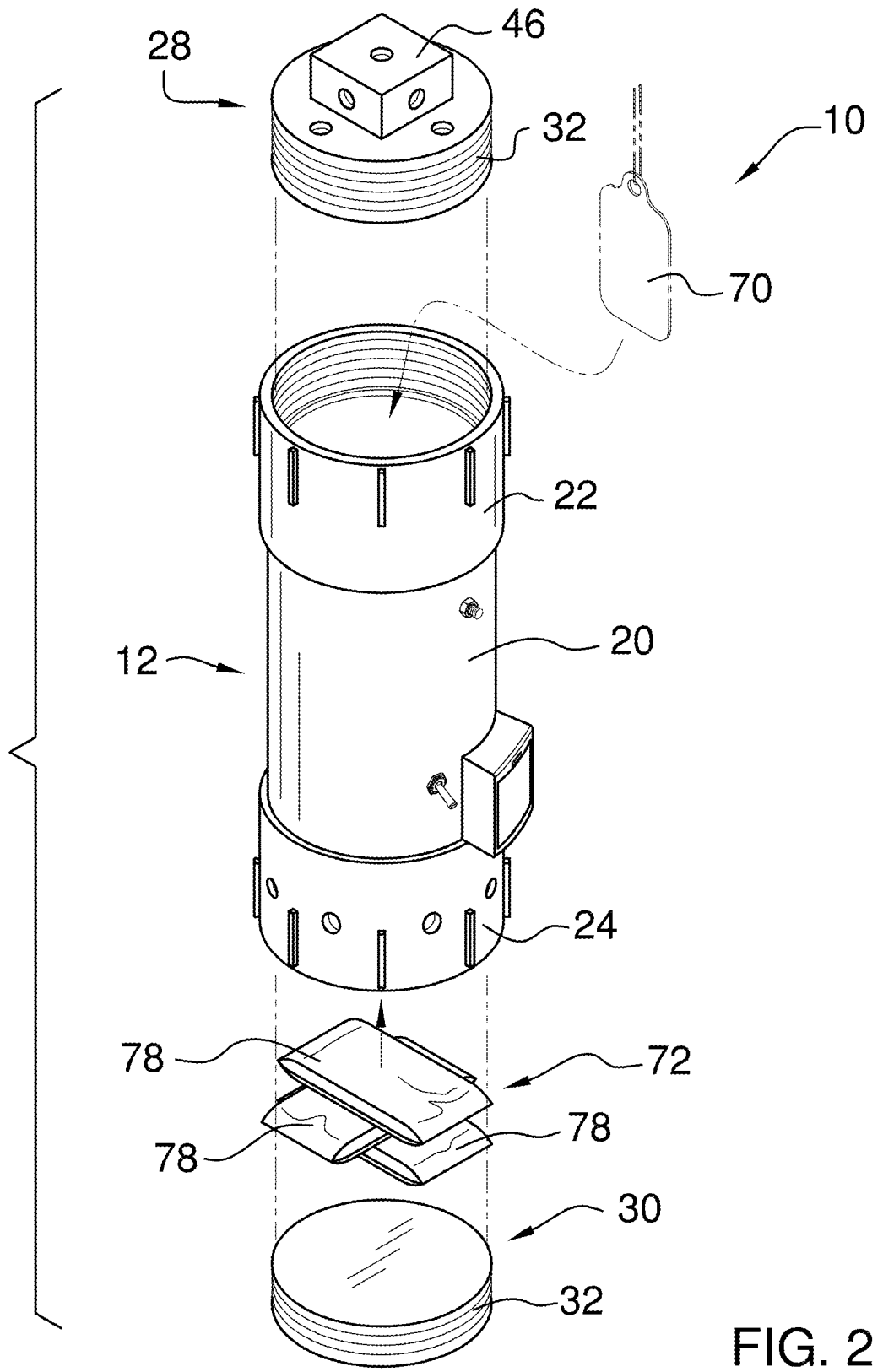
FIG. 2 is an exploded view of an embodiment of the disclosure.
Figure 3:
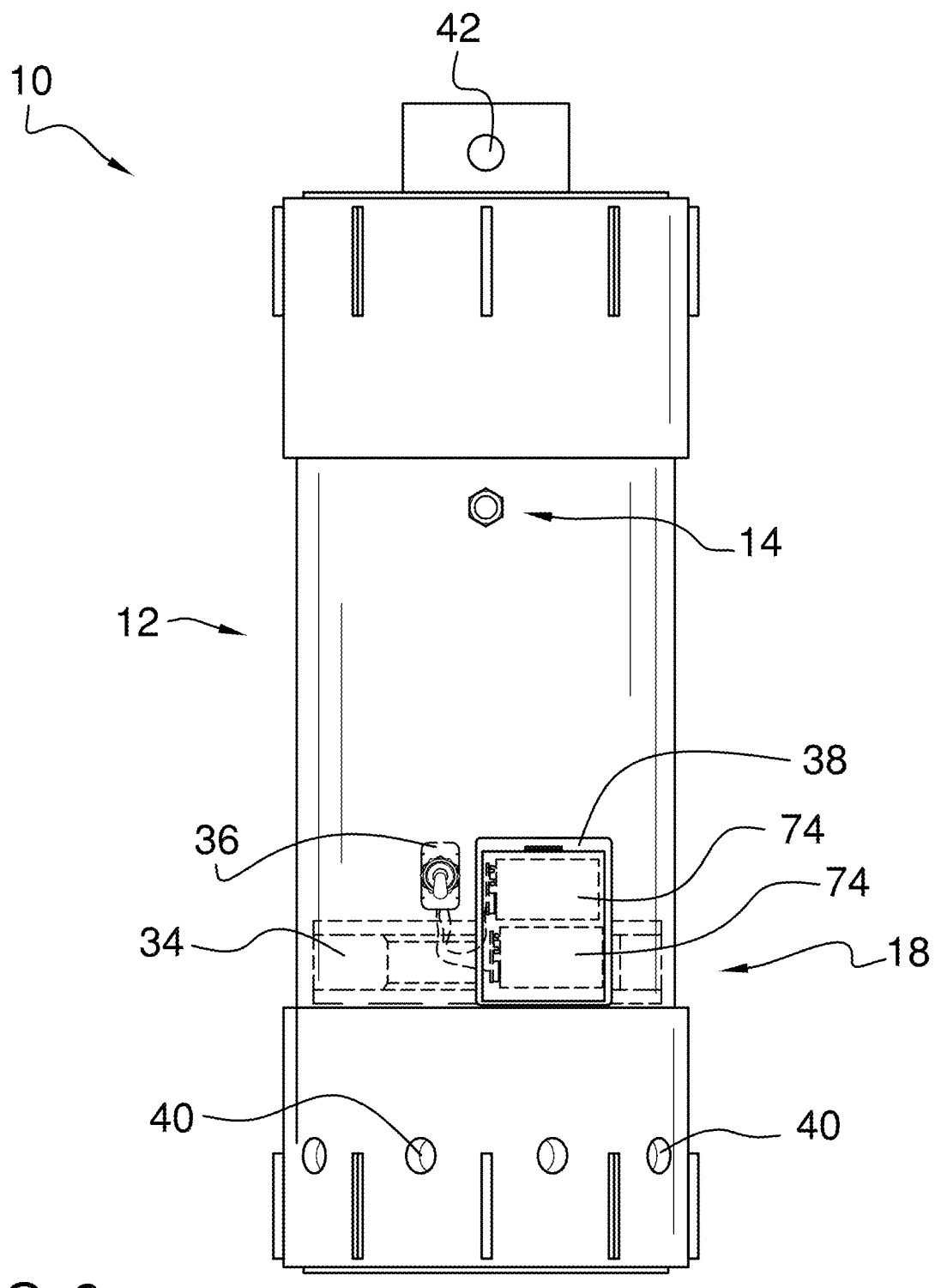
FIG. 3 is a side view of an embodiment of the disclosure.
Figure 5:
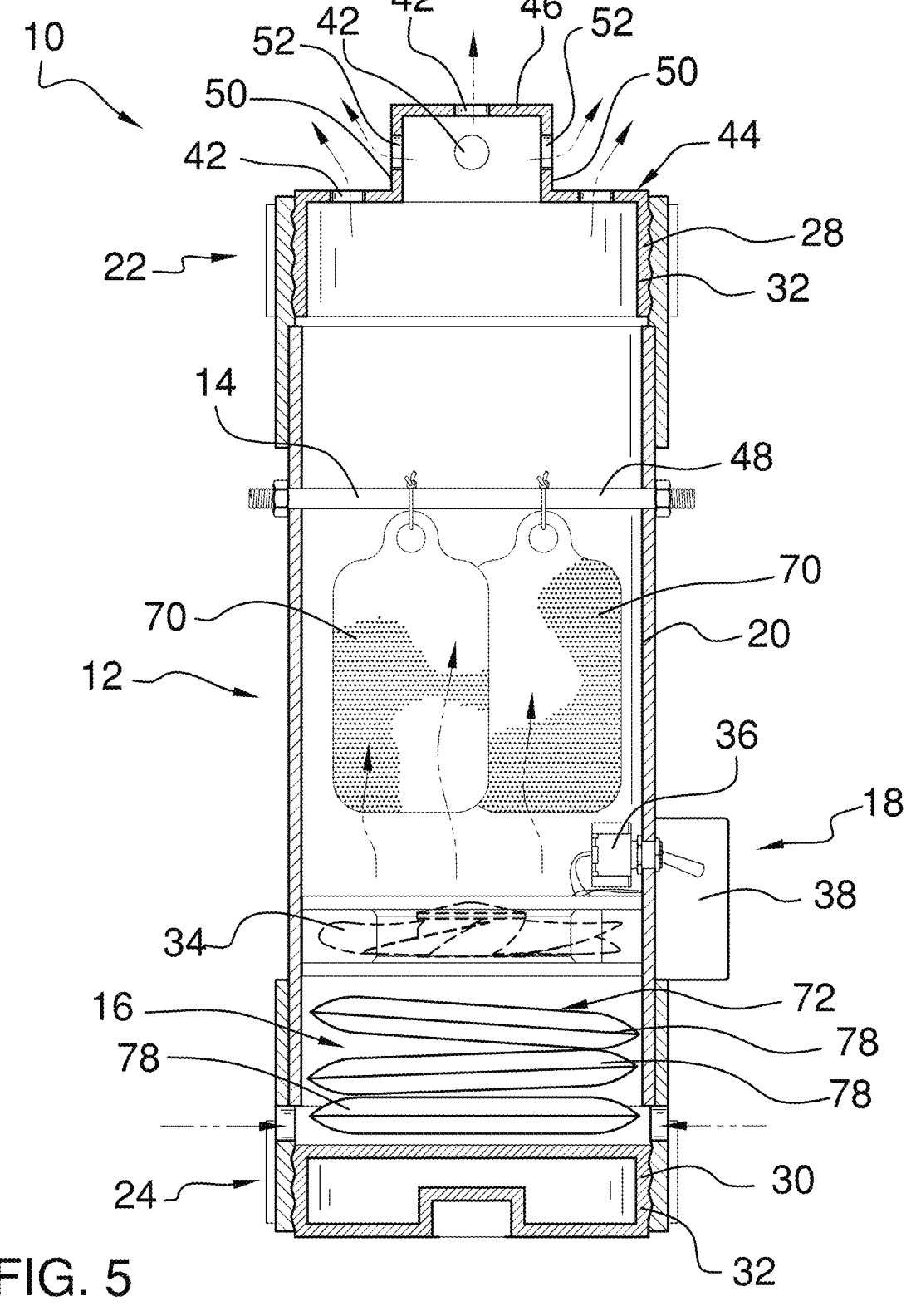
FIG. 5 is a cross-sectional view of an embodiment of the disclosure.

In the exemplary embodiment shown, the cover assembly 26 includes a first cover 28 removably connected to the first end 22 of the main body 20 and a second cover 30 removably connected to the second end 24 of the main body 20. The main body 20 is in the shape of a cylindrical tube and the first and second covers 28, 30 comprise disk-shaped portions 32 removably inserted into the first and second ends 22, 24, respectively. In the exemplary embodiment, as shown in FIGS. 2 and 5, the disk-shaped body has an external threading and each of the first and second ends 22, 24 have an internal threading to permit the disk-shaped portion 32 to be screwed into and out of the first and second ends 22, 24. In another possible embodiment, the connection could be a friction fit using gaskets or similar or an interlocking fit using tabs or teeth.

Figure 4:
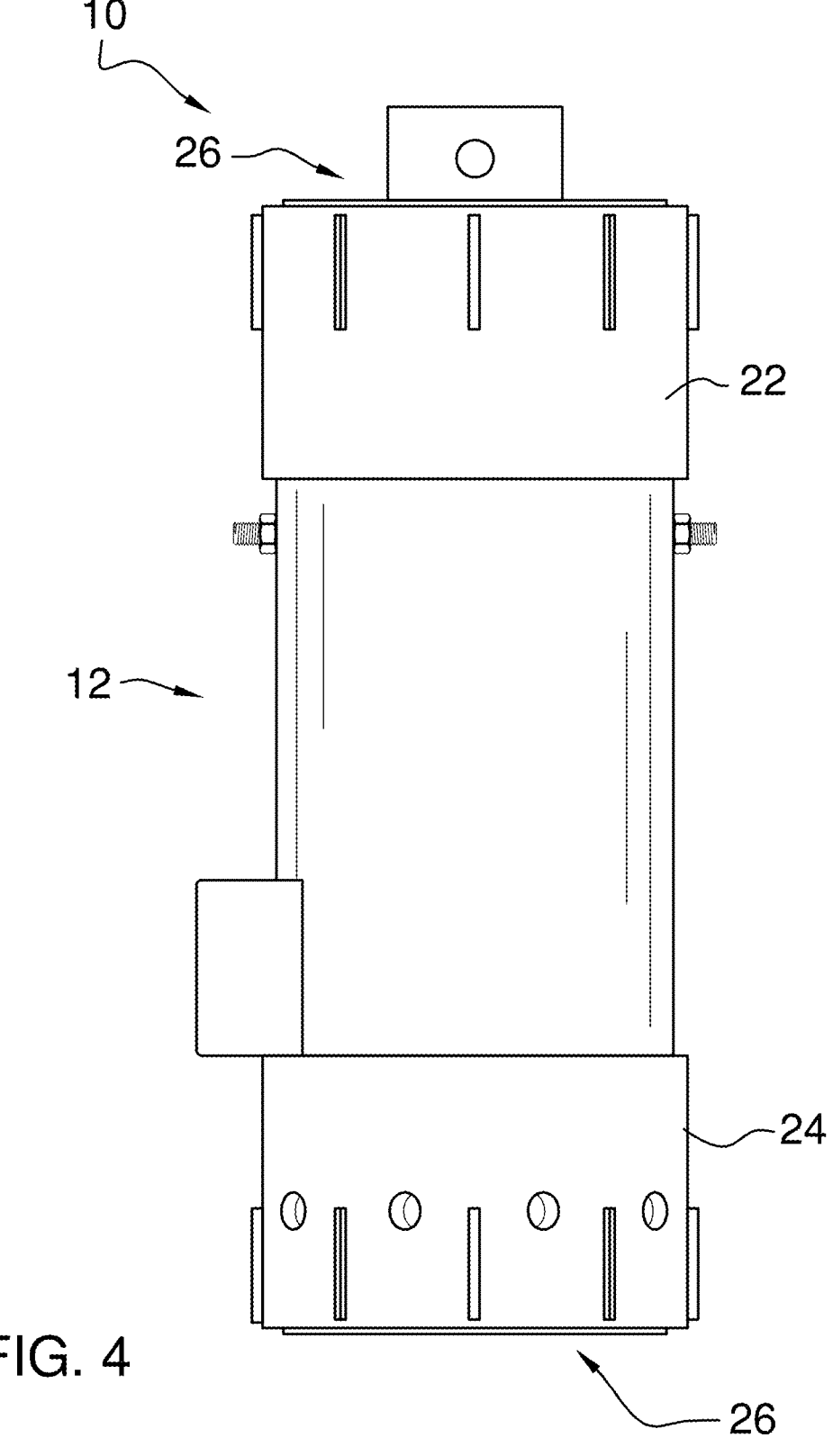
FIG. 4 is another side view of an embodiment of the disclosure.

As shown in FIGS. 4 and 5, the blower assembly 18 includes a fan 34, a power switch 36, and a battery compartment 38 designed to hold disposable batteries 74. The disposable batteries 74 could be 9-volt batteries or other disposable batteries, though rechargeable versions of these disposable batteries 74 could be utilized. As shown in FIG. 1, the air inlet apertures 40 are adjacent the second end 24 and the air outlet apertures 42 are adjacent the first end 22. The fan 34 of the blower assembly 18 is positioned between the support structure 14 and the heating compartment 16, such that the fan 34 draws air in through the air inlet apertures 40 and past an unpowered heat source 72, then blows heated air past an animal scent device 70 and out the air outlet apertures 42.

In the exemplary embodiment shown in the figures, the air outlet apertures 42 are positioned in the first cover 28. The first cover 28 includes a flat end face 44 and a projection 46 projecting from the end face 44, which projection 46 has a geometric shape, such as a cube or a rectangular prism, as shown in FIG. 1. As shown in FIG. 5, the projection 46 can include opposed parallel planar faces 50 designed to be engaged by a driving tool, such as a wrench or socket, to facilitate turning of the first cover 28 during insertion or removal. The air outlet apertures 42 are positioned in the end face 44 and the projection 46. In addition, as shown in FIG. 5, two of the air outlet apertures 42 can be aligned air outlet apertures 52 positioned one on either of the opposed parallel planar faces 50. The aligned air outlet apertures 52 permit insertion of an elongated tool, such as a screwdriver, through each to facilitate turning of the first cover 28 during insertion or removal, as well as to permit insertion of a wire 76 through each to permit hanging of the animal scent dispenser 10 from a structure or vegetation, such as shown in FIG. 6.

The heating compartment 16 is designed to hold a heating packet 78 of oxygen-reactive materials designed to generate thermal energy when exposed to oxygen. In one possible embodiment, the animal scent dispenser 10 includes one or more of said heating packets 78. For example, commercial hand warming packets or similar could be utilized, thereby providing the user with an easily-installed and always-ready heating device, as opposed to electric or fuel-based heating mechanisms. As best seen in FIG. 5, the heating compartment 16 is formed by the second cover 30, the fan 34, and side walls of the main body 20. The second cover 30 is removable to permit access to the heating compartment 16 for insertion and replacement of the heating packets 78. The air inlet apertures 40 are positioned at and operatively connected to the heating compartment 16 to permit inflow of air and oxygen into the heating compartment 16. This allows oxygen to initiate and feed the chemical reaction of the heating packets 78. In one possible embodiment, the air inlet apertures 40, as well as possibly the air outlet apertures 42, could be openable and closable to minimize access of oxygen to the heating packets 78 to slow or prevent the chemical reaction of the heating packets 78, such as to prolong the usable life of the heating packets 78 or prevent undesired activation, such as during transport of the animal scent dispenser 10.

In the exemplary embodiment shown in FIG. 5, the support structure 14 includes a rod 48 extending across the interior of the main body 20 and designed to support an animal scent device 70, either placed above and on the rod 48 or placed below and suspended from the rod 48. The support structure 14 can support a plurality of animal scent devices 70. For example, when the animal scent dispenser 10 is oriented vertically, as shown in FIG. 5, animal scent devices 70 can be hung from the support structure 14 in a suspended manner. Alternatively, an animal scent device 70, such as a canister, could be placed on top of the rod 48. In one possible embodiment, two or more rods 48 could be used to create a support web. In another possible embodiment, the rods 48 could be replaced with a platform or netting or other support structure made of metal, plastic, or other suitable materials.

Figure 6:
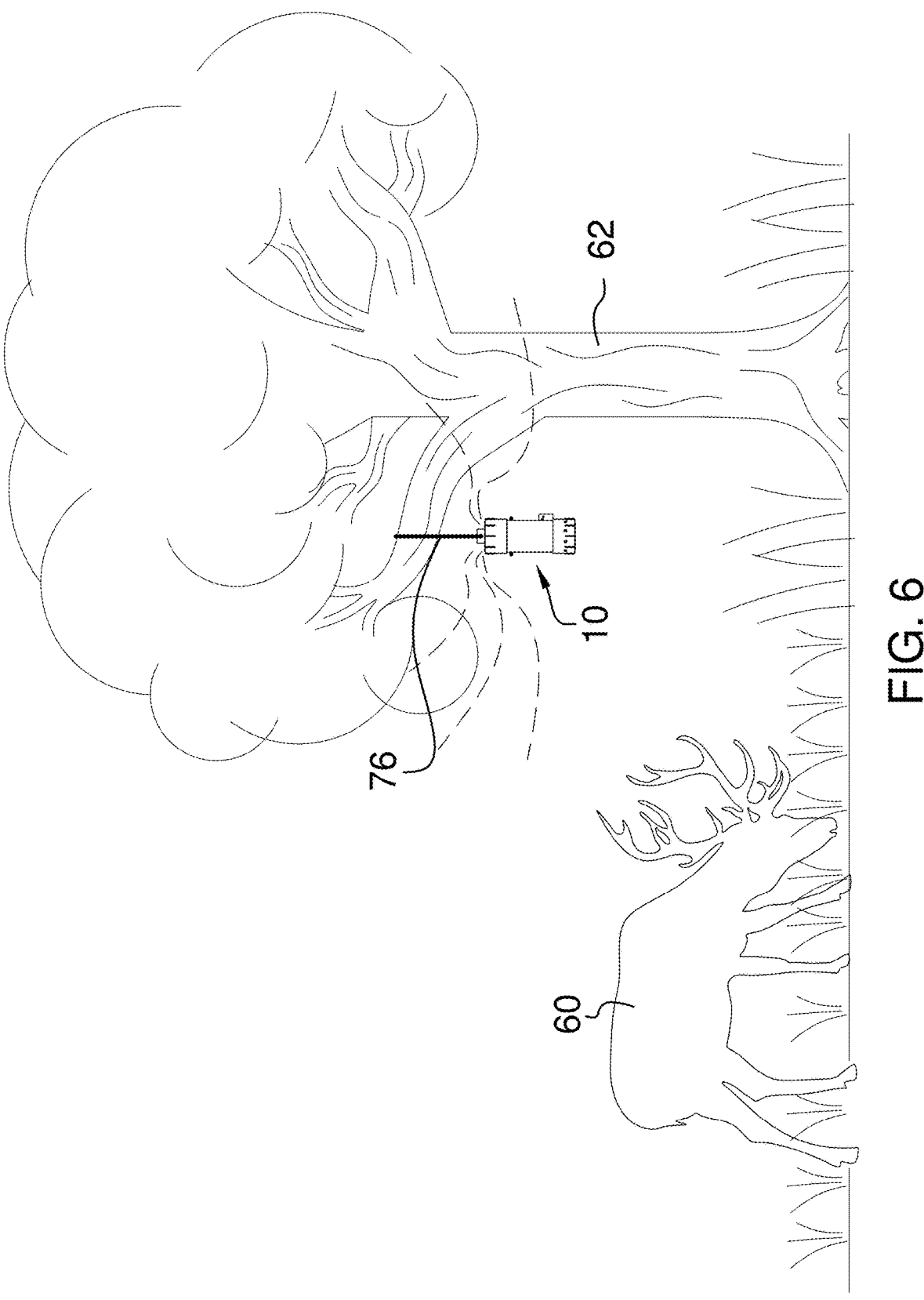
FIG. 6 is a view of an embodiment of the disclosure in use in a tree.
Figure 7:
FIG. 7 is a view of an embodiment of the disclosure in use on the ground.

Two possible uses of the animal scent dispenser 10 are shown in FIGS. 6 and 7. The user first opens the cover assembly 26, which in the embodiment shown in the figures would be the first and second covers 28, 30. The user then inserts an animal scent device 70, such as a deer scent pad to attract deer 60 as shown in FIGS. 6 and 7, into the main body 20 and supports the animal scent device 70 with the support structure 14. The user also inserts an unpowered heat source 72, such as heating packets 78 as shown, into the heating compartment 16. The user then closes the cover assembly 26, such as by reconnecting the first and second covers 28, 30. The user then places the animal scent dispenser 10 at an outdoor location. The user then activates the blower assembly 18, which draws air into the housing 12, conducts the air past the unpowered heat source 72, which heats the air. The now-heated air is conducted past the animal scent device 70, which heats the animal scent device 70 to a temperature sufficient to minimize or prevent freezing thereof. The air and animal scent material in the air is then conducted out of the housing 12 and into the surrounding environment to attract animals, such as deer 60, to the outdoor location. For example, the animal scent device 70 is a deer scent pad, and the method includes placing the animal scent dispenser 10 adjacent deer populations. The animal scent dispenser 10 can be suspended from a structure or vegetation, such as a tree 62 in FIG. 6, or can be placed on the ground. Since the air inlet apertures 40 are located in the side walls of the main body 20, the animal scent dispenser 10 can be placed vertically on the second end 24 but air can still be drawn into the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal scent dispenser comprising:
a housing comprising a main body, having a first end and a second end, and a cover assembly to permit access to an interior of said main body, wherein said housing comprises a plurality of apertures to allow air to flow through said housing;
a support structure disposed in said main body and configured to support an animal scent device within said main body;
a heating compartment disposed in said main body and configured to store an unpowered heat source therein;
a blower assembly disposed in said main body and configured to draw air into said housing, conduct the air past said unpowered heat source to heat the air, conduct the air past an animal scent device, and conduct the air and animal scent material in the air out of the housing and into the surrounding environment to attract animals to the location of the animal scent dispenser; and
wherein said support structure comprises a rod extending across the interior of said main body and configured to support an animal scent device either placed above and on said rod or placed below and suspended from said rod.

2. The animal scent dispenser of claim 1, wherein said support structure is configured to support a plurality of animal scent devices.

3. The animal scent dispenser of claim 1, wherein said blower assembly comprises a fan, a power switch, and a battery compartment configured to hold disposable batteries.

4. The animal scent dispenser of claim 1, wherein the animal scent dispenser further comprises an unpowered heat source, wherein said unpowered heat source comprises a heating packet of oxygen-reactive materials configured to generate thermal energy when exposed to oxygen.

5. The animal scent dispenser of claim 4, wherein a second cover is removable to permit access to said heating compartment for insertion and replacement of said heating packet.

6. The animal scent dispenser of claim 1, wherein said apertures comprise air inlet apertures adjacent said second end and air outlet apertures adjacent said first end, and wherein said blower assembly is disposed between said air inlet apertures and said air outlet apertures to draw air in through said air inlet apertures and blow air out through air outlet apertures.

7. The animal scent dispenser of claim 6, wherein said cover assembly comprises a first cover removably connected to said first end of said main body and a second cover removably connected to said second end of said main body.

8. The animal scent dispenser of claim 7, wherein said main body is in the shape of a cylindrical tube and said first and second covers comprise disk-shaped portions removably inserted into said first and second open ends, respectively.

9. The animal scent dispenser of claim 7, wherein said air inlet apertures are disposed at and operatively connected to said heating compartment to permit inflow of air and oxygen into said heating compartment.

10. The animal scent dispenser of claim 7, wherein said heating compartment is formed by said second cover, a fan, and side walls of said main body.

11. The animal scent dispenser of claim 7, wherein said air outlet apertures are disposed in said first cover.

12. The animal scent dispenser of claim 11, wherein said first cover comprises a flat end face and a projection projecting from said end face, wherein said air outlet apertures are disposed in said end face and in said projection.

13. The animal scent dispenser of claim 12, wherein said projection has a geometric shape comprising opposed parallel planar faces configured to be engaged by a driving tool to facilitate turning of said first cover during insertion or removal.

14. The animal scent dispenser of claim 13, wherein said air outlet apertures comprise two aligned air outlet apertures disposed one on either of said opposed parallel planar faces to permit insertion of an elongated tool through each to facilitate turning of said first cover during insertion or removal, and to permit insertion of a wire through each to permit hanging of the animal scent dispenser from a structure or vegetation.

15. A method of using the animal scent dispenser of claim 1, comprising the steps of:
opening said cover assembly;
inserting an animal scent device into said main body and supporting said animal scent device with said support structure;
inserting into said heating compartment an unpowered heat source comprising a heating packet of oxygen-reactive materials configured to generate thermal energy when exposed to oxygen;
closing said cover assembly;
placing the animal scent dispenser at an outdoor location; and
activating said blower assembly and drawing air into said housing, conducting the air past said unpowered heat source and heating the air, conducting the air past said animal scent device and heating said animal scent device to a temperature sufficient to minimize or prevent freezing thereof, and conducting the air and animal scent material in the air out of the housing and into the surrounding environment to attract animals to the outdoor location.

16. The method of claim 15, wherein said animal scent device comprises a deer scent pad, and said method comprises placing the animal scent dispenser adjacent deer populations.

17. The method of claim 15, wherein said step of placing the animal scent dispenser at an outdoor location comprises suspending the animal scent dispenser from a structure or vegetation.

18. The method of claim 15, wherein said step of placing the animal scent dispenser at an outdoor location comprises placing the animal scent dispenser on the ground.

19. An animal scent dispenser comprising:
a housing comprising a main body, having a first end and a second end, and a cover assembly to permit access to an interior of said main body, wherein said housing comprises a plurality of apertures to allow air to flow through said housing, wherein:

said cover assembly comprises a first cover removably connected to said first end of said main body and a second cover removably connected to said second end of said main body, said air outlet apertures are disposed in said first cover, said first cover comprises a flat end face and a projection projecting from said end face, wherein said air outlet apertures are disposed in said end face and in said projection, said projection has a geometric shape comprising opposed parallel planar faces configured to be engaged by a driving tool to facilitate turning of said first cover during insertion or removal, said air outlet apertures comprise two aligned air outlet apertures disposed one on either of said opposed parallel planar faces to permit insertion of an elongated tool through each to facilitate turning of said first cover during insertion or removal, and to permit insertion of a wire through each to permit hanging of the animal scent dispenser from a structure or vegetation, said main body is in the shape of a cylindrical tube and said first and second covers comprise disk-shaped portions removably inserted into said first and second open ends, respectively;

a support structure disposed in said main body and configured to support an animal scent device within said main body, wherein:

said support structure comprises a rod extending across the interior of said main body and configured to support an animal scent device either placed above and on said rod or placed below and suspended from said rod, said support structure is configured to support a plurality of animal scent devices;

a heating compartment disposed in said main body and storing an unpowered heat source therein, wherein:

said unpowered heat source comprises a heating packet of oxygen-reactive materials configured to generate thermal energy when exposed to oxygen, said second cover is removable to permit access to said heating compartment for insertion and replacement of said heating packet;

a blower assembly disposed in said main body and configured to draw air into said housing, conduct the air past said unpowered heat source to heat the air, conduct the air past an animal scent device, and conduct the air and animal scent material in the air out of the housing and into the surrounding environment to attract animals to the location of the animal scent dispenser, wherein:

said blower assembly comprises a fan, a power switch, and a battery compartment configured to hold disposable batteries; and wherein:

said apertures comprise air inlet apertures adjacent said second end and air outlet apertures adjacent said first end, and wherein said blower assembly is disposed between said air inlet apertures and said air outlet apertures to draw air in through said air inlet apertures and blow air out through air outlet apertures, said air inlet apertures are disposed at and operatively connected to said heating compartment to permit inflow of air and oxygen into said heating compartment, and said heating compartment is formed by said second cover, said fan, and side walls of said main body.

* * * * *